UNITED STATES PATENT OFFICE.

AARON S. TALBERT, OF LEXINGTON, KENTUCKY.

IMPROVED MEDICAL COMPOUND.

Specification forming part of Letters Patent No. 52,091, dated January 16, 1866.

*To all whom it may concern:*

Be it known that I, AARON S. TALBERT, of the city of Lexington, county of Fayette and State of Kentucky, have made a new and valuable Preparation to be used as a Medicine; and I hereby declare that the following is a full and exact description of the mode of preparing and using the same.

My invention consists in treating the mineral waters found at certain and divers springs in the counties of Lincoln and Garrard, in the State of Kentucky, so as to produce a new and useful medicinal preparation. I take of these mineral waters, found as above, an indefinite quantity, and by application of heat evaporate to a dry substance or salt, to which, after being thoroughly dried and bleached, I add one per centum, by weight, of common salt, (chloride of sodium,) and so put up that it will keep without injury indefinitely at all seasons and in all climates.

This substance or "salt," as I propose to call it, shall be known as "crab-orchard salts," and may be used by dissolving a tea-spoonful (more or less) in a half-tumbler of rain-water, and taking the same a half-hour or so before eating. I assert it will gently move the bowels without pain, and thus prevent and cure attacks of bilious diseases; that it will prevent and cure headaches; that if taken in smaller quantities a few nights in succession it will produce an activity of the liver equal to and much safer than calomel, and thus both prevent and cure many diseases too numerous to mention.

I do not confine myself to any exact mode of preparation, except to the simple application of heat to the aforesaid mineral waters till a crystalline salts is produced; nor do I limit myself in the strength or quantity to be given for a single dose, as that must necessarily vary with the age and condition of the patient; but

What I claim, and that for which I desire to secure Letters Patent of the United States, is—

The medicinal compound or crab-orchard salts, as herein described, the same constituting a new and useful manufacture.

A. S. TALBERT, D. D. S.

Witnesses:
 TILGHMAN FRAZER,
 WM. CASSIUS GOODLOE.